(12) United States Patent
Ko et al.

(10) Patent No.: US 8,862,413 B2
(45) Date of Patent: Oct. 14, 2014

(54) LIQUID-LEVEL GAUGE TESTING DEVICE AND TESTING METHOD THEROF

(75) Inventors: Hsueh-Chao Ko, Longtan Township (TW); Chii-Neng Ou Yang, Longtan Township (TW); Wuu-Haur Perng, Longtan Township (TW); Yao-Tung Hsu, Longtan Township (TW)

(73) Assignee: Institute of Nuclear Energy Research, Atomic Energy Council, Executive Yuan (TW)

( * ) Notice: Subject to any disclaimer, the term of this patent is extended or adjusted under 35 U.S.C. 154(b) by 652 days.

(21) Appl. No.: 13/116,231

(22) Filed: May 26, 2011

(65) Prior Publication Data
US 2012/0078543 A1    Mar. 29, 2012

(30) Foreign Application Priority Data

Sep. 24, 2010   (TW) ............................. 99132328 A

(51) Int. Cl.
G01F 17/00 (2006.01)
G01F 23/00 (2006.01)
G01F 25/00 (2006.01)

(52) U.S. Cl.
CPC ............................. *G01F 25/0061* (2013.01)
USPC ........................................ 702/55; 73/290 R

(58) Field of Classification Search
CPC .................................................... E21B 47/042
USPC ............... 702/55, 33, 50, 81, 84–85, 94, 100, 702/108, 113, 127, 150, 158, 166; 73/1.73, 73/1.79, 1.81, 209 R, 291, 304 R, 305, 73/312–314, 322, 290 R
See application file for complete search history.

(56) References Cited

PUBLICATIONS

Han et al., High Precision Intelligent Apparatus Driven by a Step Motor for Measuring Liquid Level, May 25-29, 1992, Proceedings of the IEEE International Symposium on the Industrial Electronics, vol. 1, pp. 172-176.*
Abstract of Han et al., May 25-29, 1992, 1 pp.*

* cited by examiner

*Primary Examiner* — Toan Le
(74) *Attorney, Agent, or Firm* — Schmeiser, Olsen & Watts, LLP

(57) ABSTRACT

A liquid-level gauge testing device includes a table, a height control unit, an indicator unit, and a liquid container. The height control unit includes a displacement mechanism mounted on the table and a carrier coupled with the displacement mechanism to move upward and downward. The indicator unit is mounted on the table and coupled with the carrier. The liquid container is arranged below the carrier. By providing the table, the height control unit, the indicator unit, the container and other relevant components, the liquid-level gauge testing device is able to provide increased testing accuracy with simplified testing procedures and reduced testing time. A liquid-level gauge testing method is also disclosed.

5 Claims, 5 Drawing Sheets

LIQUID-LEVEL GAUGE TESTING DEVICE AND TESTING METHOD THEROF

CROSS-REFERENCE TO RELATED APPLICATION

This non-provisional application claims priority under 35 U.S.C. §119(a) on Patent Application No(s). 099132328 filed in Taiwan, R.O.C. on Sep. 24, 2010, the entire contents of which are hereby incorporated by reference.

FIELD OF THE INVENTION

The present invention relates to a liquid-level gauge testing device and method, and more particularly to a liquid-level gauge testing device and method that enables increased testing accuracy with simplified testing procedures and reduced testing time.

BACKGROUND OF THE INVENTION

A liquid-level gauge, also referred to as a liquid-level meter, is an instrument for measuring the level of a liquid, so as to indicate any change in the level of the liquid and accordingly the currently available liquid quantity.

The liquid-level gauge is usually used to measure the level of a liquid stored in a container. The liquid can be any kind of critical liquids, including but not limited to fuel oil, industrial raw material, drinking water, and fire-extinguishing agent. In many important infrastructures, the management of critical liquid storage is of highly important. For example, to avoid undesirable operation interruption, hospitals and nuclear power plants must always have back-up fuel generators to provide emergency power supply in the case of a power failure. Therefore, it is very important to use a liquid-level gauge that is able to provide accurately measured value of fuel storage.

There are various types of liquid-level gauges designed according to different operating principles. These liquid-level gauges are quite different in terms of their reliability and sensitivity. Liquid-level gauges having similar designing principle but supplied by different manufacturers are not necessarily equal in the reliability thereof. Therefore, it is desirable to work out a way for effectively and efficiently testing and comparing different liquid-level gauges to ensure their reliability and sensitivity.

In a conventional way of testing a liquid-level gauge, a liquid container having a draining device is prepared. Water or other liquid is filled in the liquid container. The liquid-level gauge to be tested is disposed in the liquid container to obtain a measured value. Then, the draining device is turned open to drain off a predetermined quantity of water or liquid before being closed again. Thereafter, use the liquid-level gauge to measure the water or liquid remained in the liquid container to obtain another measured value. The quantity of the drained water or liquid is also measured and converted according to a bottom surface area of the liquid container into a level change value, i.e. a reference value. Compare the reference value with the value measured by the liquid-level gauge (i.e. the measured value) to determine the reliability and sensitivity of the tested liquid-level gauge.

The above-described conventional liquid-level gauge testing method has some disadvantages, such as requiring a lot of time to conduct the testing procedures, and requiring additional numerical conversion before the procedure of comparing with the measured value of the liquid-level gauge. Further, it is uneasy to control the draining device and the volume of drained water or liquid varies each time. There is also the problem of remained water or liquid in the draining device. Therefore, the conventional liquid-level gauge testing method is subject to uncertainty as a result of the above problems.

It is therefore tried by the inventor to develop an improved liquid-level gauge testing device and method to enable increased liquid-level gauge testing accuracy with simplified testing procedures and reduced testing time.

SUMMARY OF THE INVENTION

A primary object of the present invention is to provide a liquid-level gauge testing device and method, in which a table, a height control unit, an indicator unit, a liquid container and other relevant components are provided to enable increased testing accuracy with simplified testing procedures and reduced testing time.

To achieve the above and other objects, the liquid-level gauge testing device according to the present invention includes a table, a height control unit, an indicator unit, and a liquid container.

The height control unit includes a displacement mechanism mounted on the table and a carrier coupled with the displacement mechanism to move upward and downward; the indicator unit is mounted on the table and coupled with the carrier; and the liquid container is arranged below the carrier.

With the liquid-level gauge testing device composed of the table, height control unit, indicator unit, liquid container and other relevant components, it is able to test the liquid-level gauge in increased testing accuracy with simplified testing procedures and reduced testing time.

In the liquid-level gauge testing device according to the present invention, the displacement mechanism is a screw displacement mechanism. By taking advantage of the screw displacement mechanism, the carrier can be more accurately moved upward or downward.

According to a preferred embodiment of the present invention, the liquid-level gauge testing device further includes a power unit and a control unit. The power unit can be a servo motor being mounted on the table and coupled with the displacement mechanism, and the control unit is electrically connected to the power unit. With these arrangements, the carrier can be manually or electrically moved upward and downward.

To achieve the above and other objects, the liquid-level gauge testing method according to the present invention includes the following steps:

connecting a liquid-level gauge to a carrier of a height control unit, and downward extending the liquid-level gauge into a liquid container;

vertically adjusting the carrier to a first reference value and reading a first measured value of the liquid-level gauge;

vertically adjusting the carrier to a second reference value and reading a second measured value of the liquid-level gauge;

computing a displacement difference between the first and the second reference value, as well as a measurement difference between the first and the second measured value; and comparing the displacement difference with the measurement difference.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with a preferred embodiment thereof and with reference to the accompanying drawings.

Figure 1:
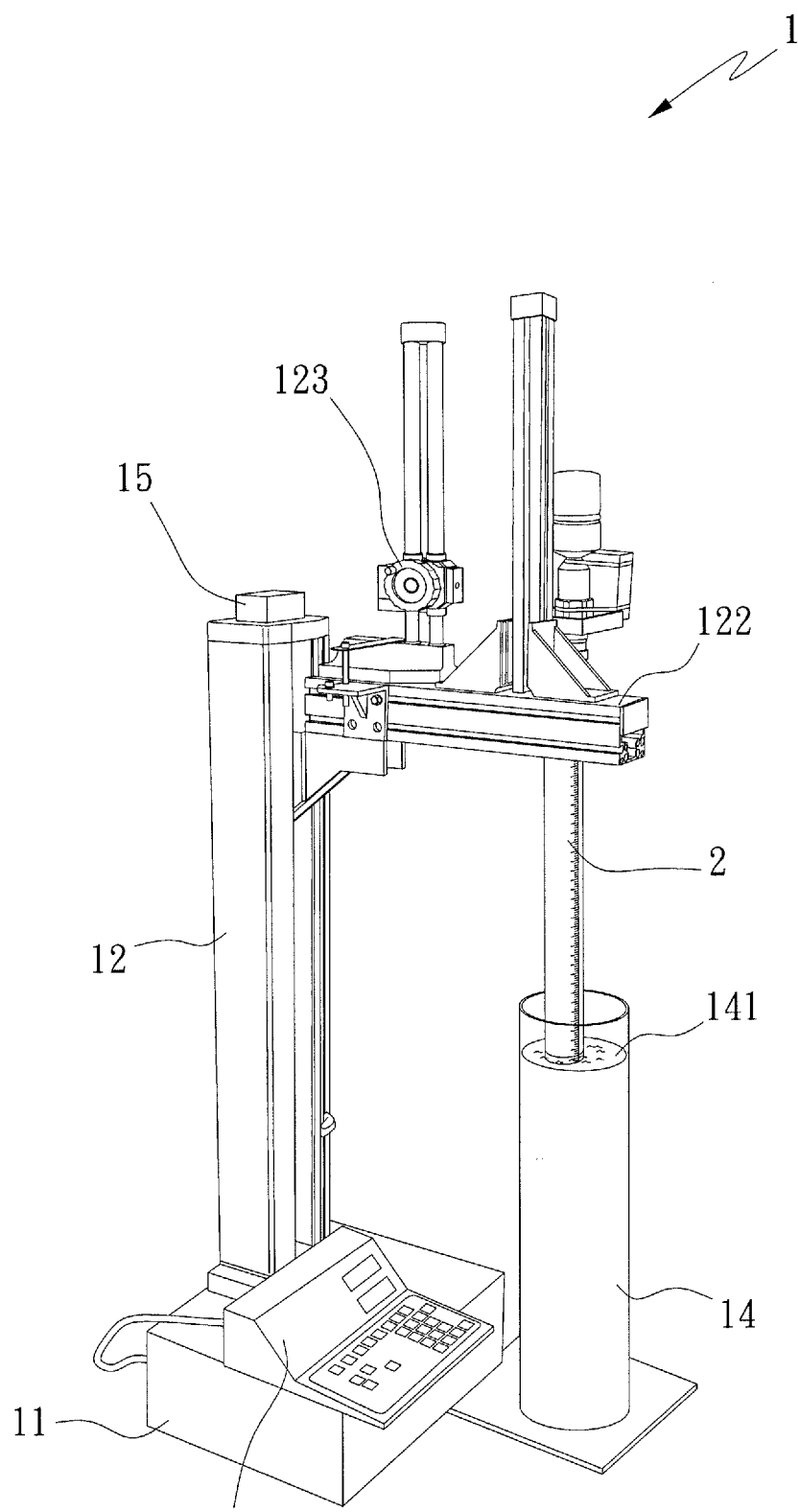
FIG. 1 is a perspective view of a liquid-level gauge testing device according to a preferred embodiment of the present invention.
Figure 2:
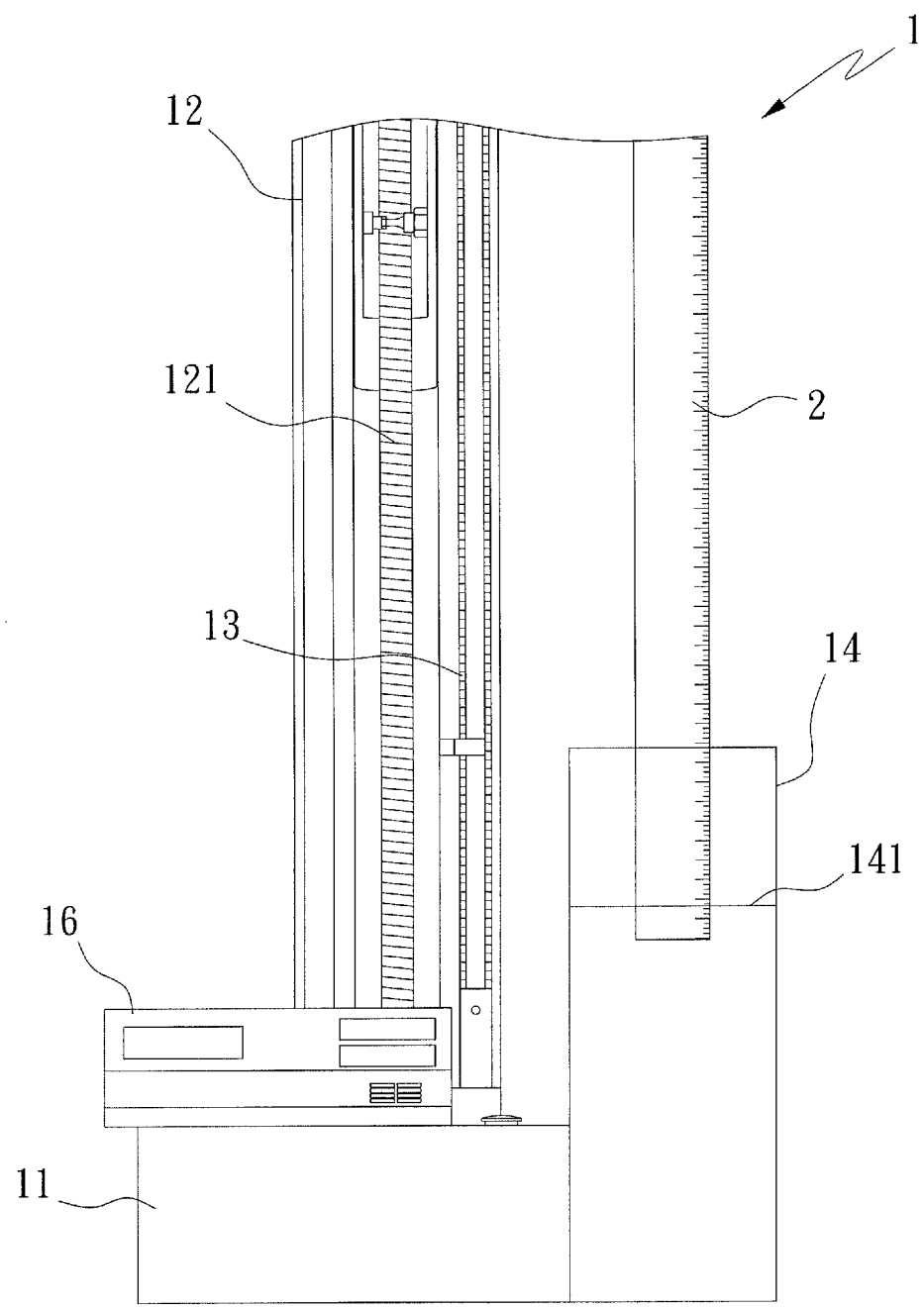
FIG. 2 is a front view of the liquid-level gauge testing device of FIG. 1.

Please refer to FIGS. 1 and 2 that are perspective and front views, respectively, of a liquid-level gauge testing device 1 according to a preferred embodiment of the present invention.

As shown, the liquid-level gauge testing device 1 includes a table 11, a height control unit 12, an indicator unit 13, and a liquid container 14.

The height control unit 12 includes a displacement mechanism 121 and a carrier 122. The displacement mechanism 121 is mounted on the table 11, and the carrier 122 is coupled with the displacement mechanism 121 to move upward and downward.

In the illustrated preferred embodiment, the height control unit 12 also includes a height fine-adjustment unit 123; and the displacement mechanism 121 is a screw displacement mechanism.

The indicator unit 13 is mounted on the table 11 and coupled with the carrier 122, and can be a general scale indicator. The liquid container 14 is arranged below the carrier 122 of the height control unit 12 for containing a type of liquid 141 therein. For example, the liquid may be water.

In the illustrated preferred embodiment, the liquid-level gauge testing device 1 further includes a power unit 15 and a control unit 16. The power unit 15 can be, for example, a servo motor mounted on the table 11 and coupled with the displacement mechanism 121 of the height control unit 12. The control unit 16 is electrically connected to the power unit 15.

Figure 3:
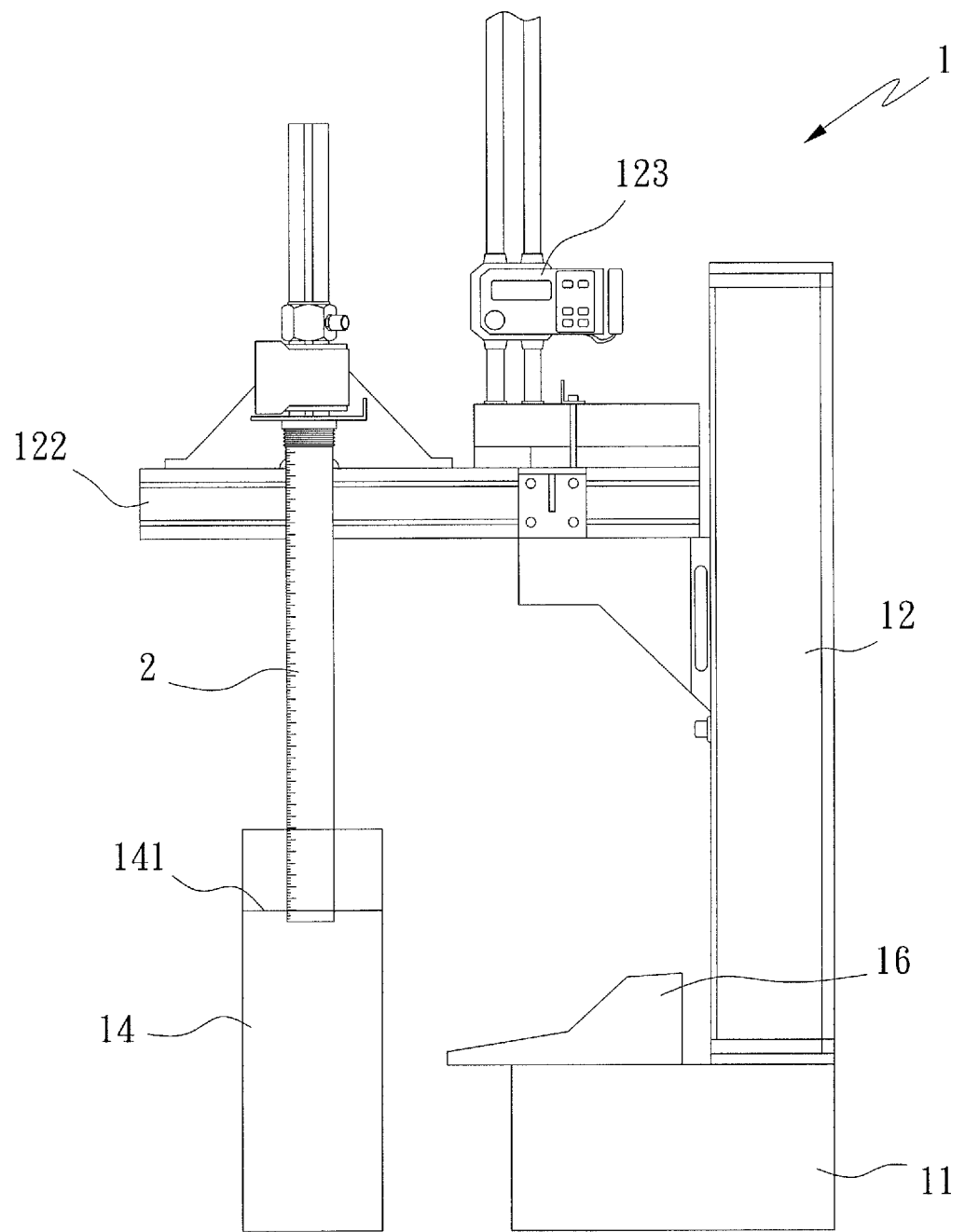
FIGS. 3 and 4 are side views showing the use of the liquid-level gauge testing device according to the preferred embodiment of the present invention to test a liquid-level gauge.
Figure 4:
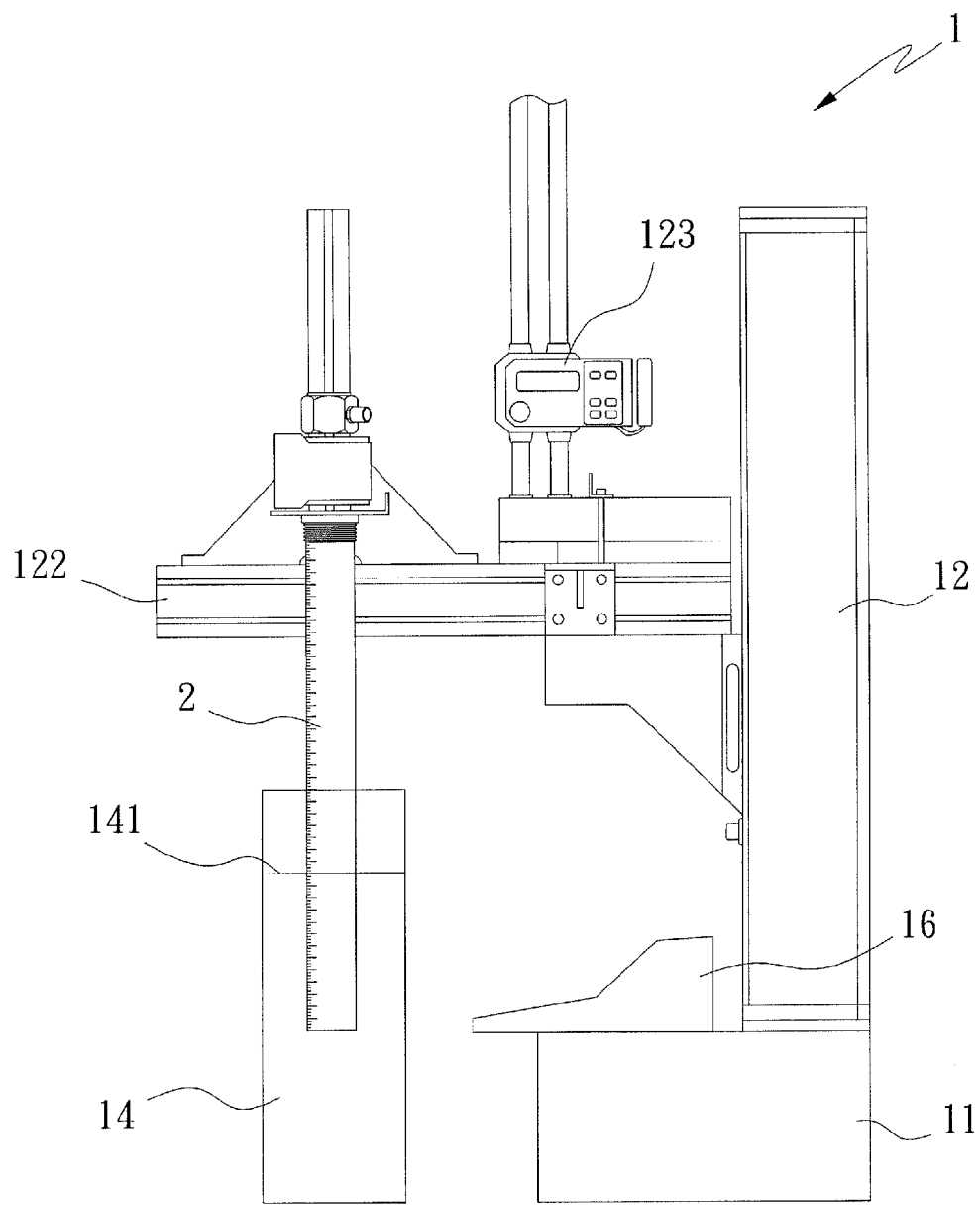
Figure 5:
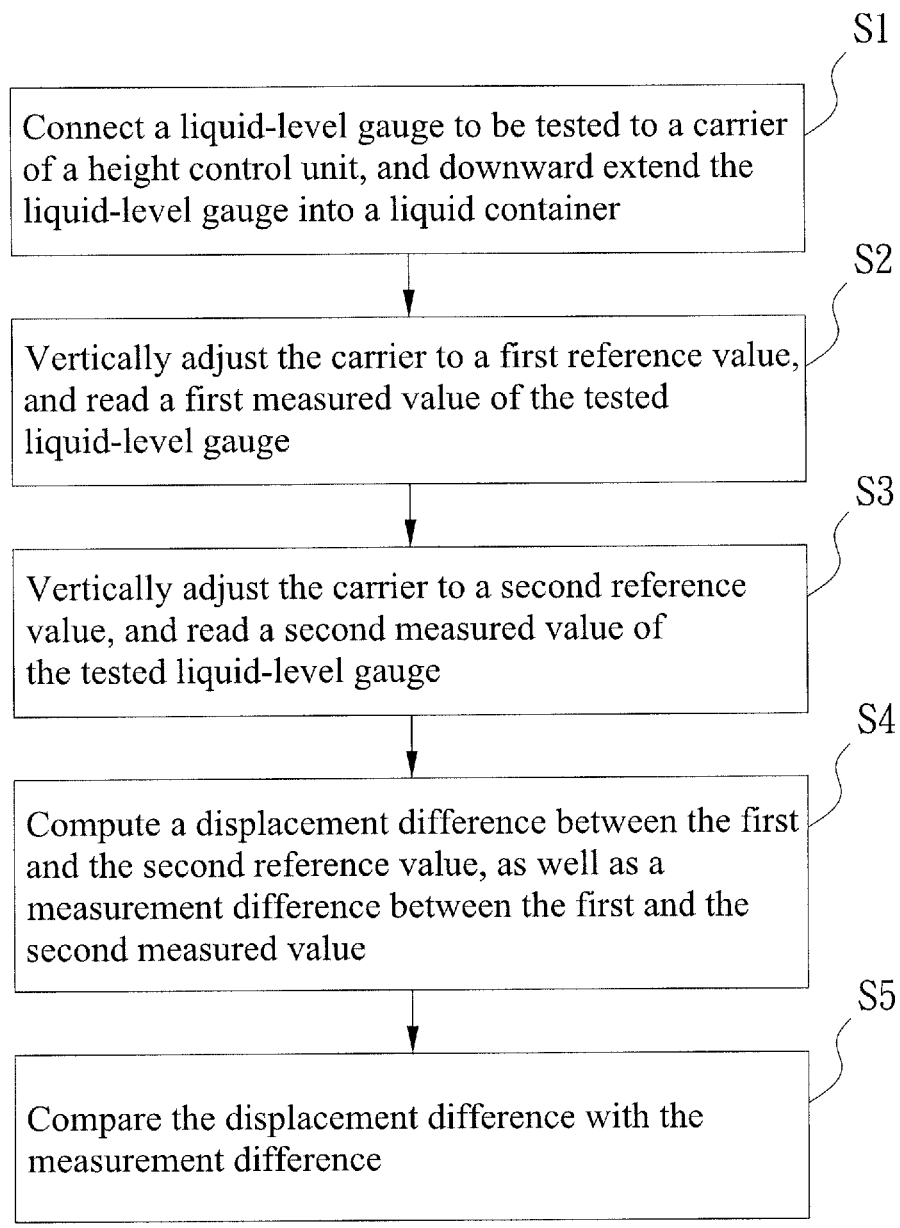
FIG. 5 is a flowchart showing the steps included in a liquid-level gauge testing method according to the present invention.

Please refer to FIGS. 1 to 5. FIGS. 3 and 4 are side views showing the use of the liquid-level gauge testing device 1 to test a liquid-level gauge 2, and FIG. 5 is a flowchart showing the steps included in a liquid-level gauge testing method according to the present invention.

To test a liquid-level gauge 2 using the testing device 1 of the present invention, first connect the liquid-level gauge 2 to the carrier 122 of the height control unit 12, such that a lower portion of the liquid-level gauge 2 is downward extended into the liquid container 14 and dipped into the liquid 141 contained in the container 14 (step S1). Meanwhile, the liquid-level gauge 2 can be electrically connected to the control unit 16.

Then, vertically move the carrier 122 of the height control unit 12 to a first reference value and read a first measured value of the liquid-level gauge 2, as shown in FIG. 3 (step S2). Thereafter, vertically move the carrier 122 of the height control unit 12 to a second reference value and read a second measured value of the liquid-level gauge 2, as shown in FIG. 4 (step S3).

In the course of height adjustment in the steps S2 and S3, the control unit 16 controls the power unit 15, which can be, for example, a servo motor, to actuate the displacement mechanism 121 of the height control unit 12, so that the carrier 122 coupled with the displacement mechanism 121 is brought by the latter to move upward or downward. Of course, the carrier 122 can also be manually moved to different heights relative to the container 14 and the liquid 141; and the height fine-adjustment unit 123 can be used to finely adjust the height position of the carrier 122. In the illustrated preferred embodiment of the present invention, the displacement mechanism 121 is a screw displacement mechanism. By taking advantage of the screw rod, the carrier 122 can be more precisely moved upward and downward. The first and the second reference value can be obtained or read from the scales on the indicator unit 13. The first and the second measured value can be obtained or read from the control unit 16 electrically connected to the liquid-level gauge 2.

After obtaining the first and second reference values as well as the first and second measured values, a displacement difference between the first and the second reference value as well as a measurement difference between the first and the second measured value can be computed (step S4). Then, the displacement difference and the measurement difference are compared with each other (step S5) to determine the reliability and the sensitivity of the tested liquid-level gauge 2.

Therefore, by providing the table 11, the height control unit 12, the indicator unit 13, the container 14 and other relevant components, the liquid-level gauge testing device 1 of the present invention can provide increased testing accuracy with simplified testing procedures and reduced testing time.

It is noted the liquid-level gauge testing device 1 can also be used to determine the linearity of measurement accuracy and the measurement repeatability or reproducibility of the liquid-level gauge 2 for future reference. In other words, by providing more reference values and more measured values, such as providing a third, a fourth and a fifth reference value at a fixed increment of displacement in height as well as corresponding third, fourth and fifth measurement values, and comparing these values, it is able to know whether the tested liquid-level gauge 2 shows any linearity in its measurement accuracy. In addition, the test can be repeatedly conducted at the same reference values or the same liquid levels to ensure the reproducibility and reliability of the measured values of the liquid-level gauge 2. For instance, given the first reference value and the first measured value are both 50 cm, and the second reference value and the second measured value are both 100 cm, the test is then repeated at the first reference value of 50 cm. In the case the first measured value in the repeated test is also 50 cm, it indicates the tested liquid-level gauge 2 has reliable reproducibility. The number of times of repeating the test can be increased according to actual conditions, so as to ensure the reliability of the tested liquid-level gauge 2.

By providing the table, the height control unit, the indicator unit, the container and other relevant components, the liquid-level gauge testing device and method of the present invention can provide increased testing accuracy with simplified testing procedures and reduced testing time, making the liquid-level gauge testing device and method novel and improved. The present invention is also industrially valuable because products derived from the present invention would doubtlessly satisfy the current market demands.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A liquid-level gauge testing device for testing a liquid-level gauge comprising:
    a table;
    a height control unit including a displacement mechanism mounted on the table and a carrier coupled with the displacement mechanism to move upward and downward, the carrier being configured to carry the liquid-level gauge;
    an indicator unit being mounted on the table and coupled with the carrier, the indicator unit being configured to indicate a position of the carrier; and
    a liquid container being arranged below the carrier.

2. The liquid-level gauge testing device as claimed in claim 1, wherein the height control unit further includes a height fine-adjustment unit.

3. The liquid-level gauge testing device as claimed in claim 1, further comprising a power unit and a control unit; the power unit being mounted on the table and coupled with the displacement mechanism, and the control unit being electrically connected to the power unit.

4. The liquid-level gauge testing device as claimed in claim 3, wherein the power unit is a servo motor.

5. The liquid-level gauge testing device as claimed in claim 1, wherein the displacement mechanism is a screw displacement mechanism.

* * * * *